US012023926B2

(12) United States Patent
Fujimura et al.

(10) Patent No.: US 12,023,926 B2
(45) Date of Patent: Jul. 2, 2024

(54) LIQUID DISCHARGE HEAD, LIQUID DISCHARGE DEVICE, AND LIQUID DISCHARGE APPARATUS

(71) Applicants: Yuki Fujimura, Kanagawa (JP); Hitoshi Usami, Kanagawa (JP)

(72) Inventors: Yuki Fujimura, Kanagawa (JP); Hitoshi Usami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 135 days.

(21) Appl. No.: 17/966,909

(22) Filed: Oct. 17, 2022

(65) Prior Publication Data

US 2023/0147417 A1 May 11, 2023

(30) Foreign Application Priority Data

Nov. 9, 2021 (JP) ................................ 2021-182705

(51) Int. Cl.
*B41J 2/14* (2006.01)

(52) U.S. Cl.
CPC ......... *B41J 2/14201* (2013.01); *B41J 2/1433* (2013.01); *B41J 2002/14491* (2013.01)

(58) Field of Classification Search
CPC .................. B41J 2/14201; B41J 2/1433; B41J 2002/14491; B41J 2/161; B41J 2002/14362; B41J 2002/14419; B41J 2/14233; B41J 2/1623
See application file for complete search history.

(56) References Cited

U.S. PATENT DOCUMENTS 9,221,259 B2 * 12/2015 Tsujiuchi .............. B41J 2/1623
2014/0375725 A1 12/2014 Sameshima et al.
2017/0151782 A1 6/2017 Takahashi et al.

FOREIGN PATENT DOCUMENTS

JP 2002-240303 8/2002

* cited by examiner

*Primary Examiner* — Lisa Solomon
(74) *Attorney, Agent, or Firm* — XSENSUS LLP

(57) ABSTRACT

A liquid discharge head includes: a first member; and a second member bonded to the first member, wherein the first member has: a first protrusion protruding to the second member, a second protrusion protruding to the second member, the second protrusion having a height different from the first protrusion, the second member includes: a first portion bonded to the first protrusion with a first adhesive; and a second portion bonded to the second protrusion with a second adhesive, the second portion having a height different from the first portion, and a type of the second adhesive is different from a type of the first adhesive.

12 Claims, 8 Drawing Sheets

COMPARATIVE EXAMPLE

COMPARATIVE EXAMPLE

COMPARATIVE EXAMPLE

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-182705, filed on Nov. 9, 2021, in the Japan Patent Office, the entire disclosure of which is hereby incorporated by reference herein.

BACKGROUND

Technical Field

The present embodiment relates to a liquid discharge head, a liquid discharge device, and a liquid discharge apparatus.

Related Art

A liquid discharge head includes, for example, a nozzle plate having multiple nozzles, a chamber member provided with a liquid chamber in communication with a nozzle, an actuator including a piezoelectric element and an electrode, a support substrate bonded to the actuator, and a frame provided with a common chamber from which liquid is supplied to the liquid chamber.

Adhesive is used for bonding between members in such a liquid discharge head. For such bonding, types of adhesive and techniques of coating of adhesive are available.

For example, an electrostatic actuator and a head frame are bonded together with elastic adhesive. Such a configuration can improve reliability at the time of bonding, reduce cost, and prevent a nozzle plate or substrate from detachment in an electrostatic actuator.

SUMMARY

A liquid discharge head includes: a first member: and a second member bonded to the first member, wherein the first member has: a first protrusion protruding to the second member, a second protrusion protruding to the second member, the second protrusion having a height different from the first protrusion, the second member includes: a first portion bonded to the first protrusion with a first adhesive; and a second portion bonded to the second protrusion with a second adhesive, the second portion having a height different from the first portion, and a type of the second adhesive is different from a type of the first adhesive.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
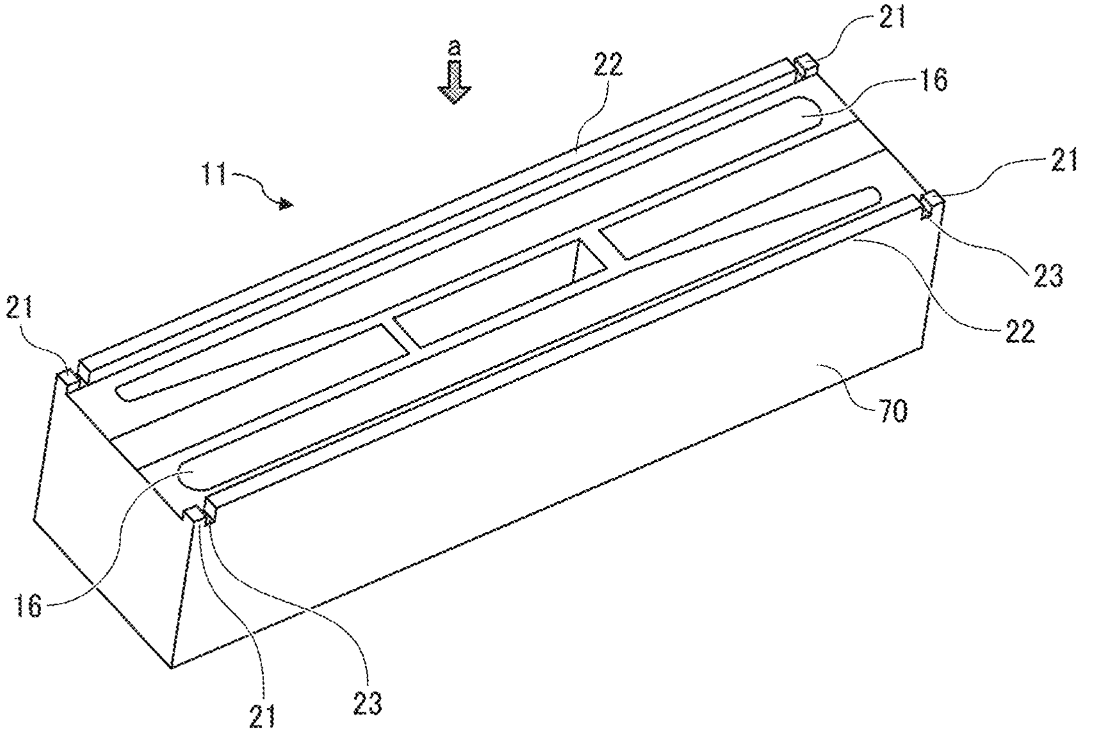
FIG. 1 is a schematic perspective view of an exemplary first member.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge head, a liquid discharge device, and a liquid discharge apparatus according to the present embodiment will be described below with reference to the drawings. Note that the present embodiment is not limited to the following embodiments and thus other embodiments, additions, modifications, and deletions can be made within the scope conceivable by those skilled in the art. Any aspects that achieve the function and effect of the present embodiment are to be included in the scope of the present embodiment.

Liquid Discharge Head

The liquid discharge head according to the present embodiment includes: a first member; and a second member bonded to the first member with adhesive, in which the first member has multiple protrusions protruding to the second member, the multiple protrusions includes two or more types of protrusions different in height, the second member has a portion that is bonded to the multiple protrusions and varies in height depending on a height of each of the multiple protrusions, and the adhesive includes two or more types of adhesive.

An embodiment of the present embodiment will be described.

Note that a first member and a second member bonded together are also referred to as a bonded member. Mixture of adhesives is also referred to as accidental contact.

Figure 2:
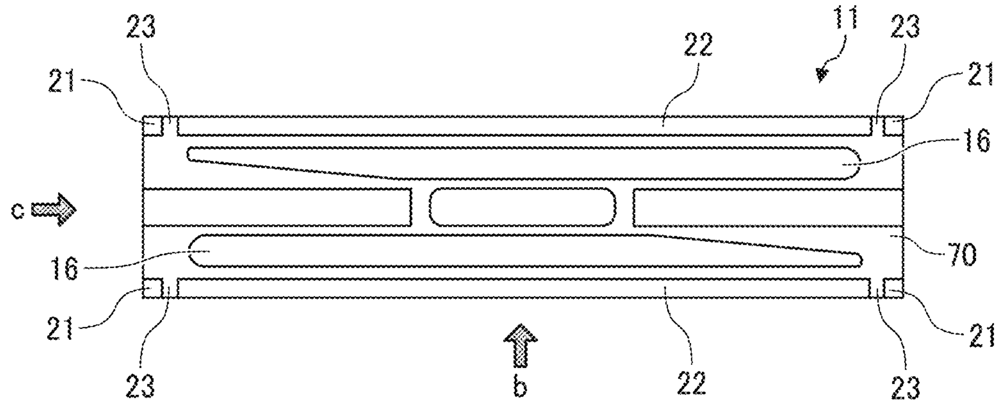
FIG. 2 is a schematic plan view of the exemplary first member.

FIG. 1 is a schematic perspective view of a first member 11 included in the liquid discharge head according to the present embodiment. FIG. 2 is a schematic plan view of the first member 11 included in the liquid discharge head according to the present embodiment, corresponding to a top view in the direction of a of FIG. 1.

In the present embodiment, the first member 11 has multiple protrusions, such as a first protrusion 21 and a second protrusion 22. The multiple protrusions each has a height corresponding to the height of the bonding region of a second member to the first member. For example, the second protrusion 22 is higher than the first protrusion 21. In the illustrated example, the first member 11 has four corners each provided with the first protrusion 21 and has longitudinal edges each along which the second protrusion 22 is provided. Places for the first protrusion 21 and the second protrusion 22 can be appropriately selected.

In the example illustrated in FIGS. 1 and 2, the first member 11 is a frame 70 in the liquid discharge head. Preferably, the first member 11 is the frame. However, the first member 11 is not limited to the frame. Note that, although reference signs 11 and 70 are given, the first member is the frame in the present example. The frame 70 has, for example, a common channel 16 for supplying liquid to a liquid chamber.

Figure 3:
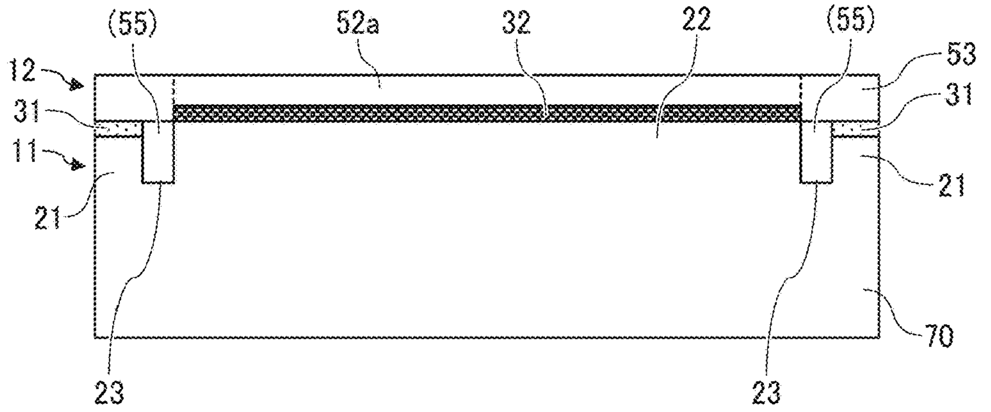
FIG. 3 is a schematic side view of exemplary bonding between the first member and a second member.
Figure 4:
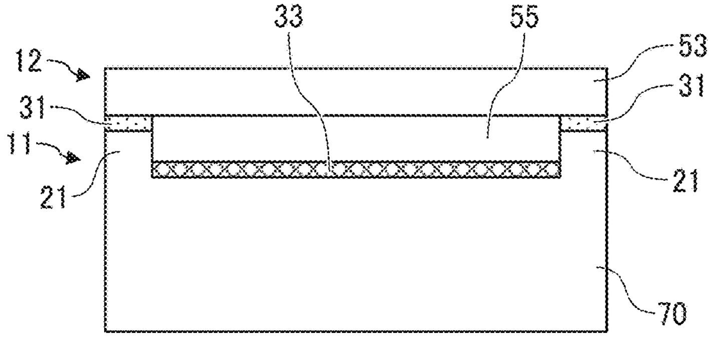
FIG. 4 is another schematic side view of the exemplary bonding between the first member and the second member.

FIG. 3 is a schematic side view of a bonded member in the present embodiment and illustrates the first member 11 in the direction of b of FIG. 2. FIG. 4 is another schematic side view of the bonded member in the present embodiment and illustrates the first member 11 in the direction of c of FIG. 2. Note that the first member 11 in the present embodiment is rectangular in shape in plan view, having a longitudinal direction and a lateral direction (FIG. 2). FIG. 3 corresponds to a longitudinal side view and FIG. 4 corresponds to a lateral side view.

In the example illustrated in FIGS. 3 and 4, a second member 12 includes an actuator substrate 53 and a support substrate 55 bonded to the actuator substrate 53. The actuator substrate 53 includes, for example, a nozzle plate having multiple nozzles, a chamber member having a liquid chamber in communication with a nozzle, and an actuator including a piezoelectric element and an electrode.

The actuator substrate 53 is also referred to as a “first portion” bonded to the first protrusion 21.

As illustrated in FIG. 3, the first member 11 has multiple protrusions protruding to the second member 12. In the example, the multiple protrusions includes the first protrusion 21 and the second protrusion 22. In FIG. 3, namely, in the longitudinal side view, two first protrusions 21 are provided on the end sides, and a second protrusion 22 is provided on the center side.

The multiple protrusions includes two or more types of protrusions different in height. As illustrated in FIG. 3, the first protrusion 21 and the second protrusion 22 are different in height. In the illustrated example, the first protrusion 21 is lower than the second protrusion 22.

Note that the region between the first protrusion 21 and the second protrusion 22 is also referred to as a groove 23. The first protrusion 21 and the second protrusion 22 are not continuous in formation. That is, the first protrusion 21 and the second protrusion 22 are intermittent in formation through the groove 23.

Heights can be appropriately selected for the multiple protrusions. In the illustrated example, for example, the first protrusion 21 has a height of approximately 500 μm and the second protrusion 22 has a height of approximately 1000 μm with respect to the flat portion of the first member 11 (portion different from the protrusions). The flat portion of the first member 11 corresponds, for example, to the bottom of the groove 23.

In the present embodiment, the second member 12 has a portion that bonds the multiple protrusions and varies in height depending on each protrusion. For example, as illustrated in FIG. 3, the second member 12 has the portion bonded to the first protrusion 21 higher in height than the portion bonded to the second protrusion 22.

In the present embodiment, two or more types of adhesive are provided for bonding the first member 1I and the second member 12 together. Use of two or more types of adhesive enables, for example, an aspect in which multiple types of adhesive different in curing rate is used for prevention of misalignment in bonding. For example, use of an epoxy adhesive and a photo-curable adhesive (e.g., an ultraviolet-curable (UV-curable) adhesive) enables prompt acquisition of a function of tentative retaining due to the photo-curable adhesive.

In the present embodiment, for example, a first adhesive 31 as a UV-curable adhesive is used in the bonding region of the first protrusion 21, and a second adhesive 32 as an epoxy adhesive is used in the bonding region of the second protrusion 22.

In the present embodiment, the first member 11 is provided with multiple protrusions different in height, and the second member 12 has a portion that bonds the multiple protrusions and varies in height depending on each protrusion. Thus, a bonded member based on bonding with two or more types of adhesive has the coated adhesives different in level, enabling isolation between the respective coat regions of the adhesives. Thus, the different types of adhesive are inhibited from mixing together in each bonding region. In the present embodiment, even in a case where different types of adhesive are coated in adjacent regions, the different types of adhesive are inhibited from mixing together in each bonding region. According to the present embodiment, mixture of adhesives can be inhibited in each bonding region. Thus, each adhesive can be inhibited from curing trouble, leading to acquisition of a favorable bonding state. In addition, misalignment can be inhibited in bonding.

In the present embodiment, the groove 23 is provided between the first protrusion 21 and the second protrusion 22.

In the example illustrated in FIG. 3, for example, in a case where a surplus amount of first adhesive 31 or second adhesive 32 is produced at the time of bonding of the members, the surplus amount of first adhesive 31 or second adhesive 32 flows in the groove 23 between the first protrusion 21 and the second protrusion 22, resulting in no flow to the adjacent bonding region. Thus, the different types of adhesive can be further inhibited from mixing together in each bonding region.

The support substrate 55 in FIG. 3 will be supplementarily described. Referring to FIG. 3, the reference sign of the support substrate 55 is indicated in parentheses. The reason is that the support substrate 55 is not located between the first protrusion 21 and the second protrusion 22 but located behind the groove 23 in aside view. Thus, the groove 23 due to intermittent protrusion formation can retain an outflow of adhesive between the protrusions, so that mixture of adhesives can be further inhibited in each bonding region.

In the present embodiment, preferably, the same type of adhesive is used to the protrusions identical in height in the multiple protrusions, and different types of adhesive are used to the protrusions different in height in the multiple protrusions. For example, as in the present embodiment, the first adhesive 31 is used to the first protrusions 21 identical in height (two first protrusions on the end sides in the longitudinal direction). The second adhesive 32 different in type from the first adhesive 31 is used to the second protrusion 22 different in height from the first protrusion 21.

Thus, the different types of adhesive can be further inhibited from mixing together in each bonding regions.

As described above, the first member 11 in the present embodiment is rectangular in shape in plan view, having a longitudinal direction and a lateral direction (refer to FIG. 2). The multiple protrusions includes at least the first protrusion 21 and the second protrusion 22 mutually different in height. The first member 11 has four corners each provided with the first protrusion 21 and has longitudinal edges each along which the second protrusion 22 is provided. Thus, different types of adhesive can be inhibited from mixing together in each bonding region. In addition, a proper bonding region is selected between the first member 11 and the second member 12, leading to an improvement in bonding strength. Easily achieved is an aspect in which a tentative retaining adhesive is used to the first protrusion 21.

In the present embodiment, the groove 23 is provided between the first protrusion 21 and the second protrusion 22.

The provided groove 23 can retain an outflow of adhesive between the protrusions, so that mixture of adhesives can be further inhibited in each bonding region.

As illustrated in FIG. 4, preferably, the first member 11 has a portion that is different from the first protrusion 21 and the second protrusion 22 and is bonded with a third adhesive 33 different from the first adhesive 31 and the second adhesive 32. In the present embodiment, at least three types of adhesive are provided. Preferably, the first protrusion 21 is bonded with the first adhesive 31 that is photo-curable. The second protrusion 22 is bonded with the second adhesive 32 that is not photo-curable. The first member 11 has a portion that is different from the first protrusion 21 and the second protrusion 22 and is bonded with the third adhesive 33 different from the first adhesive 31 and the second adhesive 32.

In this case, for example, use of a UV-curable adhesive as the first adhesive 31 that is photo-curable enables prompt acquisition of a function of tentative retaining. As the second adhesive 32 or the third adhesive 33, an adhesive having a proper reinforcement effect can be selected, so that an improvement can be made in bonding strength.

In this case, for example, an epoxy adhesive is preferably used as the second adhesive 32 and an epoxy adhesive different in type from the second adhesive 32 is preferably used as the third adhesive 33, but this is not particularly limiting.

An appropriate selection can be made in the thickness of adhesive. The thickness of adhesive may be constant at all the protrusions, but is preferably changed depending on each protrusion. For example, in the present embodiment, preferably, the protrusions identical in height in the multiple protrusions are identical in the thickness of adhesive, and the protrusions different in height in the multiple protrusions are different in the thickness of adhesive. Such difference in the thickness of adhesive enables further inhibition of different types of adhesive from mixing together in each bonding region.

In the present embodiment, at the time of bonding, the first adhesive 31 has a thickness of approximately 100 μm, the second adhesive 32 has a thickness of approximately 150 μm, and the third adhesive 33 has a thickness of approximately 50 μm.

The thickness of each of the first adhesive 31 and the second adhesive 32 does not necessarily require adjusting as above. Since the first member 11 is provided with the multiple protrusions different in height, the respective gaps in the bonding regions are different (distance between the first member 11 and the second member 12), resulting in variations in the thickness of adhesive. In this case, the thickness of each of the first adhesive 31 and the second adhesive 32 is identical to the gap in the corresponding bonding region.

A thickness can be appropriately selected for the third adhesive 33. For provision between the frame 70 and the support substrate 55, preferably, the third adhesive 33 has a thickness having no influence on discharging performance. Such a thickness of approximately 50 μm as above is preferable because of less influence on discharging performance.

Entry of foreign matter between the frame 70 and the support substrate 55 in bonding causes discharge trouble. Bonding with a coat of adhesive higher in height than such foreign matter causes the foreign matter to be embedded in the adhesive, resulting in prevention of discharge trouble. Such a thickness of approximately 50 μm of the third adhesive 33 as above enables prevention of such trouble as above.

The liquid discharge head according to the present embodiment enables inhibition of mixture of adhesives, leading to inhibition of curing trouble. Thus, an improvement can be made in quality and an improvement can be made in discharging performance. The original adhesive capacity can be achieved because of no accidental contact of different types of adhesive, leading to inhibition of ink erosion.

In a case where the first member 11 and the second member 12 are used in the liquid discharge head, members to be used as the first member 11 and the second member 12 can be appropriately selected from the liquid discharge head. For example, as in the above example, preferably, the first member 11 is the frame 70 having the common channel for supplying ink to a liquid chamber, and the second member 12 includes the actuator substrate 53 and the support substrate 55 bonded to the actuator substrate 53. The actuator substrate 53 includes, for example, a nozzle plate having multiple nozzles, a chamber member having a liquid chamber in communication with a nozzle, and an actuator including a piezoelectric element and an electrode.

In the present embodiment, the first member 11 and the second member 12 in the liquid discharge head are not limited to the above configuration. For example, the first member 11 may be the actuator substrate 53, and multiple protrusions may be provided on the actuator substrate 53. In this case, the second member 12 may be the frame 70 and may have a bonding portion varying in height depending on the height of each protrusion. From the viewpoint of member production or the viewpoint of prevention of ink entry, preferably, the first member 11 is the frame 70 and the second member 12 includes the actuator substrate 53 and the support substrate 55.

The support substrate 55 is bonded to the actuator substrate 53 and has, for example, a drive region for the piezoelectric element. Note that, in FIGS. 3 and 4, no illustrations are given for the piezoelectric element and the drive region for the piezoelectric element.

The schematic side view of FIG. 3 illustrates the electrode 52*a* in the actuator, schematically. For example, the electrode 52*a* corresponds to a region that does not face the support substrate 55 but is in contact with a wiring, as illustrated in FIGS. 5B and 5C or in FIG. 9 to be described below. In the figure, the electrode 52*a* is indicated with broken lines.

The electrode 52*a* is also referred to as a "second portion" bonded to the second protrusion 22. The electrode 52*a* (second portion) has a height different from the first portion (actuator substrate 53).

Note that the electrode 52*a* is provided ranging from one end to the other end in the direction of thickness of the actuator substrate 53 in the illustration, but this is just schematic. For example, as in FIG. 9 to be described below, the electrode 52*a* is included in the actuator. In the present example, the electrode 52*a* includes no chamber member and no nozzle substrate.

Next, another example of the present embodiment will be described with FIGS. 5A to 5C.

Figure 5A:
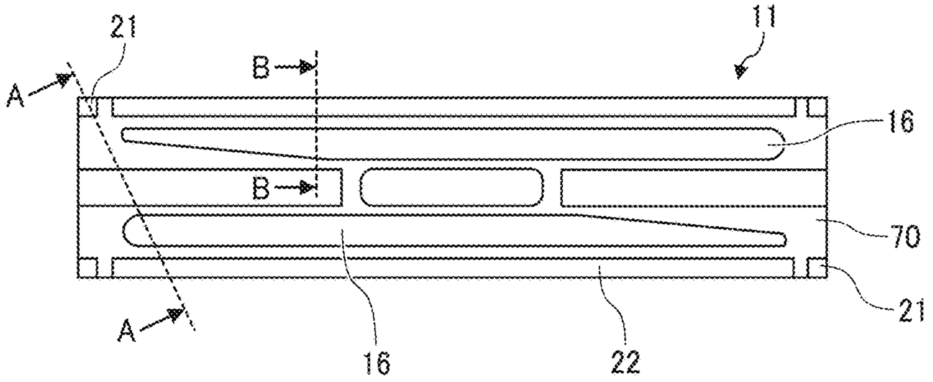
FIGS. 5A, 5B, and 5C are, respectively, a schematic plan view of other exemplary bonding between the first member and the second member, a schematic cross-sectional view taken along line A-A of FIG. 5A, and a schematic cross-sectional view taken along line B-B of FIG. 5A.
Figure 5B:
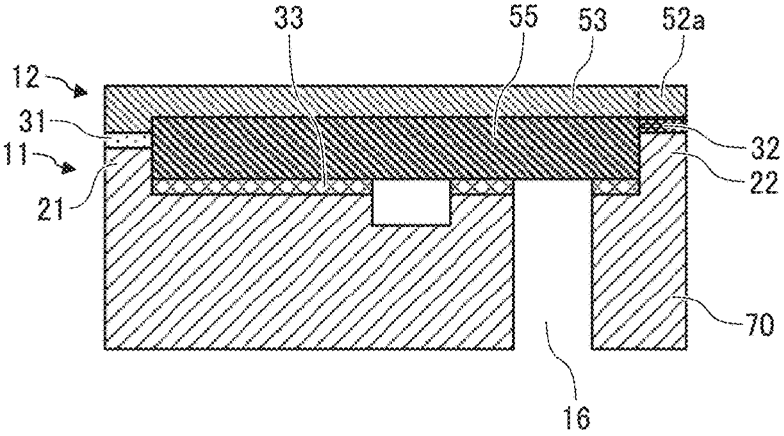
Figure 5C:
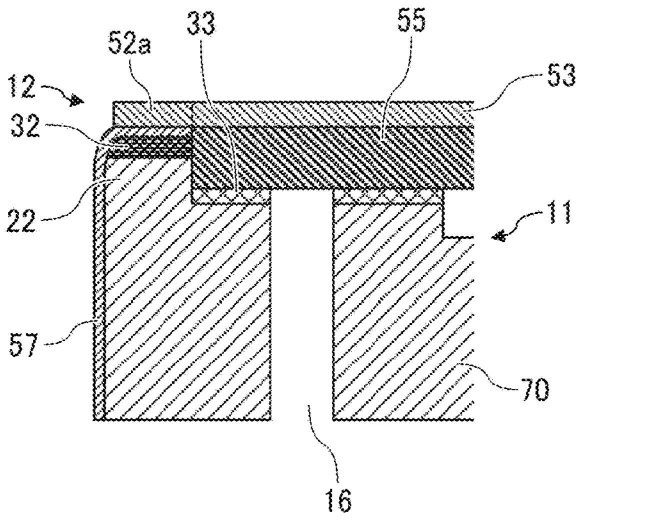

FIG. 5A is a schematic plan view of a first member 11 in the present example. Similarly to the above example, the first member 11 is a frame 70. FIGS. 5B and 5C are schematic cross-sectional views of a bonded member in the present example. FIG. 5B is a cross-sectional view taken along line A-A of FIG. 5A. FIG. 5C is a cross-sectional view taken along line B-B of FIG. 5A.

FIG. 5A is substantially the same as FIG. 2. FIG. 5B illustrates a configuration similar to the configuration in the above example. That is, the first member 11 is provided with multiple protrusions different in height (a first protrusion 21 and a second protrusion 22), and a second member 12 has a portion that is bonded to the multiple protrusions and varies in height depending on each protrusion.

The second member 12 in the present example includes an actuator substrate 53 and a support substrate 55. A liquid discharge head 1 in the present example includes a wiring 57 through which a drive signal is supplied to a piezoelectric element.

In the present example, the actuator substrate 53 includes an actuator including the piezoelectric element and an electrode. The electrode 52*a* in the present example corresponds to a region that does not face the support substrate 55 but is in contact with the wiring 57. The electrode 52*a* is bonded to a protrusion of the first member 11 (e.g., the second protrusion 22) through the wiring 57 and adhesive. Note that, in FIGS. 5A to 5C, no reference signs are given for the actuator and the piezoelectric element.

A thickness can be appropriately selected for the electrode 52*a*. The electrode 52*a* is thinnest in the actuator. In the present example, the electrode 52*a* has, for example, a thickness of 75 μm.

In the present example, as illustrated in FIG. 5C, the gap between the wiring 57 and the second protrusion 22 is filled with a second adhesive 32. Thus, the strength of the electrode 52*a* thinnest in the actuator can be retained. The adhesive between the electrode 52*a* and the second protrusion 22 functions as a reinforcer, enabling retainment of the strength of the electrode 52*a*. Thus, the electrode 52*a* can be prevented from being damaged. For example, during assembly with any gap not filled with the adhesive between the electrode 52*a* and the protrusion, the electrode 52*a* receives the influence of external force. Thus, the electrode 52*a* is likely to be damaged.

Adhesive to be provided between the electrode 52*a* and the protrusion can be appropriately selected. Preferably, an epoxy adhesive is selected. Such an adhesive functions adequately as a reinforcer, facilitating prevention of the electrode 52*a* from being damaged.

In the present embodiment, at least either in a cross-sectional view or in a side view, preferably, the first member 11 has a recess due to two protrusions and the second member 12 has a third protrusion that fits in the recess. In this case, a further improvement can be made in the bonding state between the first member 11 and the second member 12.

Figure 6A:
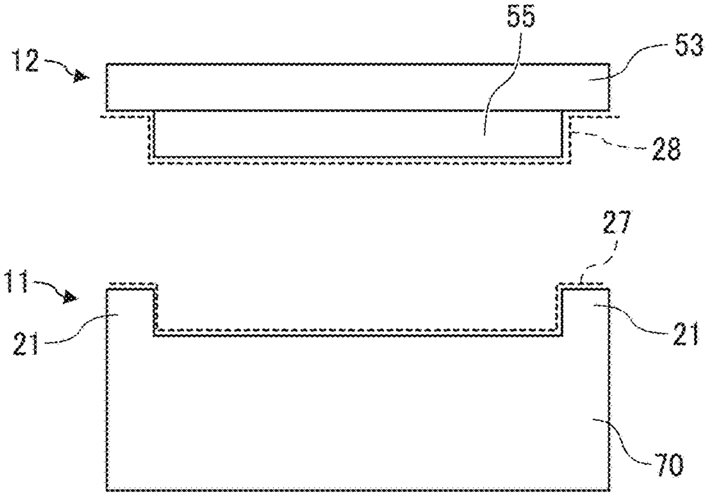
FIGS. 6A and 6B are, respectively, a schematic side view and a schematic cross-sectional view each illustrating an exemplary recess that the first member has and an exemplary third protrusion that the second member has.
Figure 6B:
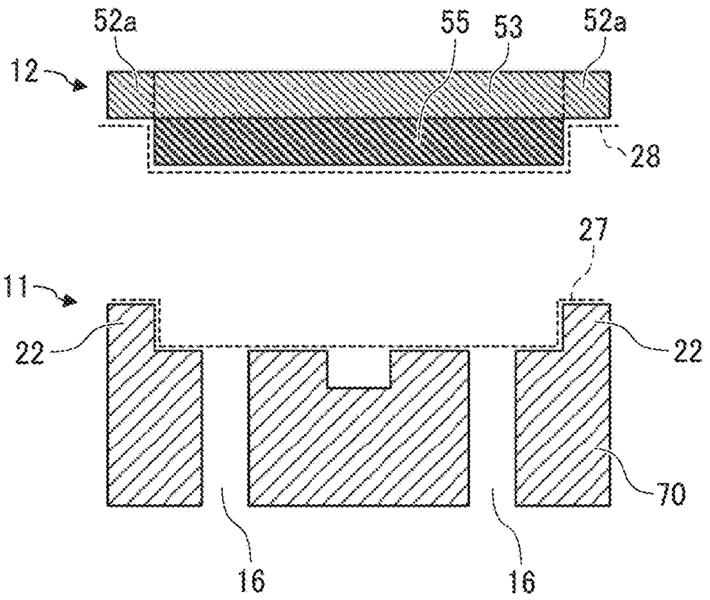

FIGS. 6A and 6B are explanatory views each for an exemplary recess and an exemplary third protrusion.

FIG. 6A is a schematic side view of the first member 1I and the second member 12 not bonded together and corresponds to the schematic side view of FIG. 4. In the present example, the first member 11 has a recess 27 (portion indicated with a broken line in FIG. 6A) due to two first protrusions 21. In the present example, the second member 12 includes the actuator substrate 53 and the support substrate 55, and has a third protrusion 28 (portion indicated with a broken line in FIG. 6A). Then, the recess 27 and the third protrusion 28 fit mutually in bonding of the first member 11 and the second member 12. Thus, a further improvement can be made in the bonding state between the first member 11 and the second member 12.

FIG. 6B is a schematic cross-sectional view of the first member 11 and the second member 12 not bonded together and corresponds to, for example, in a case where line B-B of FIG. 5A is further extended, a schematic cross-sectional view taken along the extended line B-B. In the present example, the first member 11 has a recess 27 (portion indicated by a broken line in FIG. 6B) due to two second protrusions 22. In the present example, the second member 12 includes the actuator substrate 53 and the support substrate 55, and has a third protrusion 28 (portion indicated with a broken line in FIG. 6B). Then, the recess 27 and the third protrusion 28 fit mutually in bonding of the first member 11 and the second member 12. Thus, a further improvement can be made in the bonding state between the first member 11 and the second member 12.

Note that two protrusions for formation of the recess 27 may be mutually identical or different in height. The protrusion of the third protrusion 28 may be formed with a member different from the support substrate 55.

Next, Comparative Example 1 that is not included in the present embodiment will be described with FIGS. 7A to 7C. Comparative Example 1 is similar to the present embodiment except that a frame is provided with no protrusions different in height.

Figure 7A:
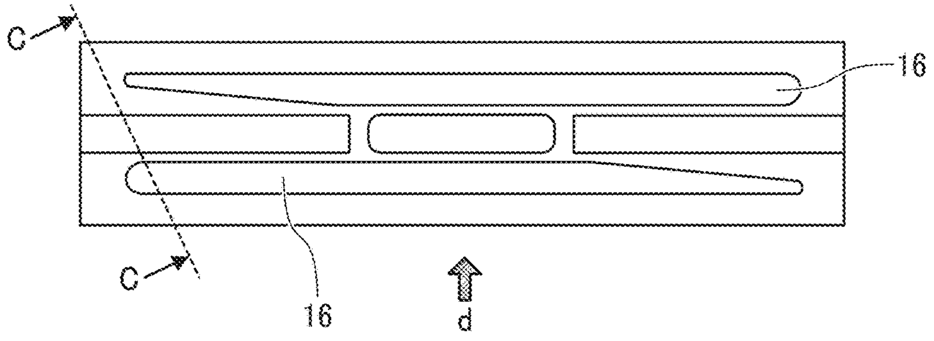
FIGS. 7A, 7B, and 7C are, respectively, a schematic plan view, a schematic side view, and a schematic cross-sectional view taken along line C-C of FIG. 7A in Comparative Example 1.
Figure 7B:
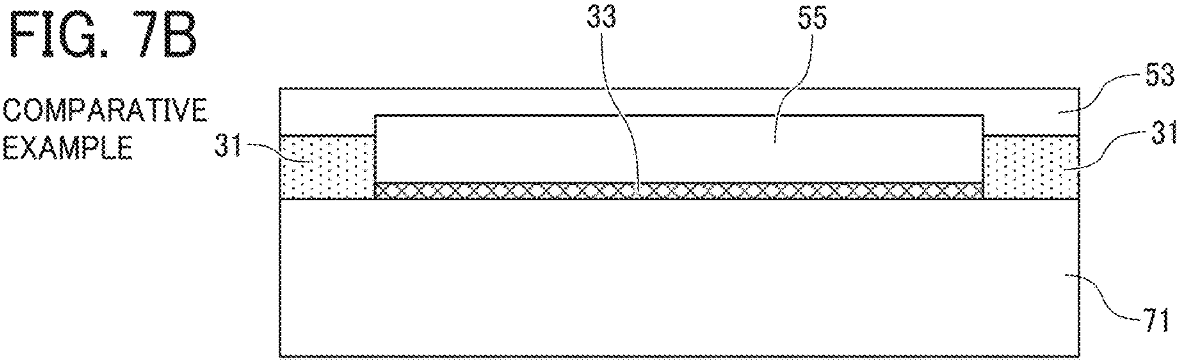
Figure 7C:
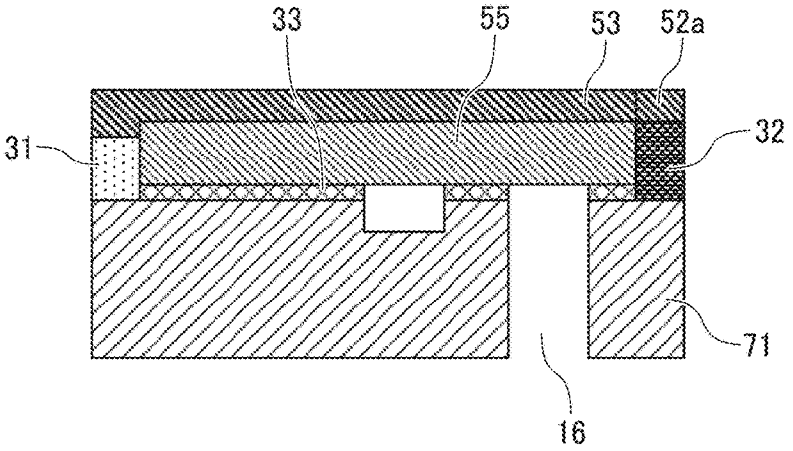

FIG. 7A is a schematic plan view of a frame 71 in Comparative Example 1. FIG. 7B is a schematic side view of a bonded member in Comparative Example 1 and illustrates the frame 71 in the direction of d of FIG. 7A. FIG. 7C is a schematic cross-sectional view of the bonded member in Comparative Example 1, namely, a cross-sectional view taken along line C-C of FIG. 7A.

The frame 71 in Comparative Example 1 is provided with no protrusions different in height. The frame 71 and an actuator substrate 53 are bonded together with a first adhesive 31 and a second adhesive 32. The frame 71 and a support substrate 55 are bonded together with a third adhesive 33.

In Comparative Example 1, the base of coating of adhesive is uniform all over the frame 71. Thus, in production of the bonded member in Comparative Example 1, all adjacent adhesives mix together. More particularly, (1) the first adhesive 31 and the second adhesive 32 mix together, (2) the first adhesive 31 and the third adhesive 33 mix together, and (3) the second adhesive 32 and the third adhesive 33 mix together. Thus, curing trouble occurs in Comparative Example 1, leading to difficulty in bonding between the frame 71 and each of the actuator substrate 53 and the support substrate 55.

In Comparative Example 1, in order to avoid mixture of adjacent adhesives, the amount of coating of each adhesive was reduced. However, bonding with respective reduced amounts of coating of the adhesives caused a non-adhesion region in each bonding region. Thus, no favorable bonding state was acquired. In a liquid discharge head 1 including the acquired bonded member, leak trouble occurred. Because of inadequate sealing between the frame 71 and each of the actuator substrate 53 and the support substrate 55, ink entry occurred. Thus, the liquid discharge head 1 did not function properly.

As above, the present embodiment, in which multiple protrusions different in height is provided on the first member, is effective in preventing mixture of different types of adhesive in each bonding region.

Next, Reference Example 1 will be described with FIGS. 8A to 8C.

Figure 8A:
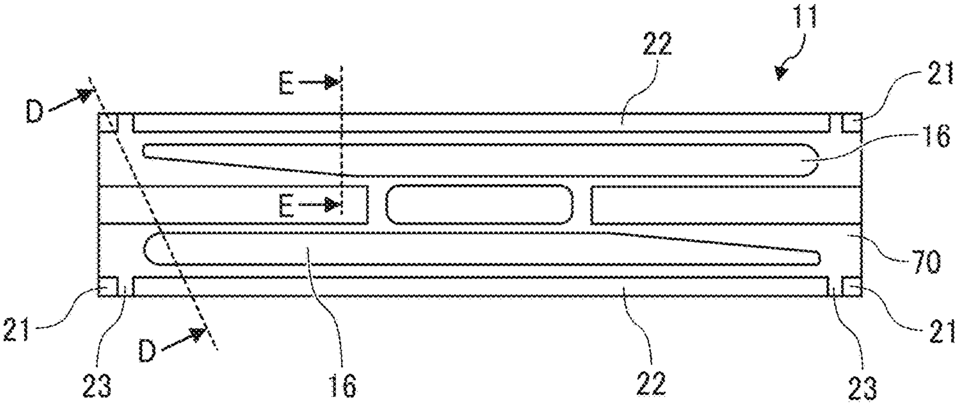
FIGS. 8A, 8B, and 8C are, respectively, a schematic plan view, a schematic cross-sectional view taken along line D-D of FIG. 8A, and a schematic cross-sectional view taken along line E-E of FIG. 8A in Reference Example 1.
Figure 8B:
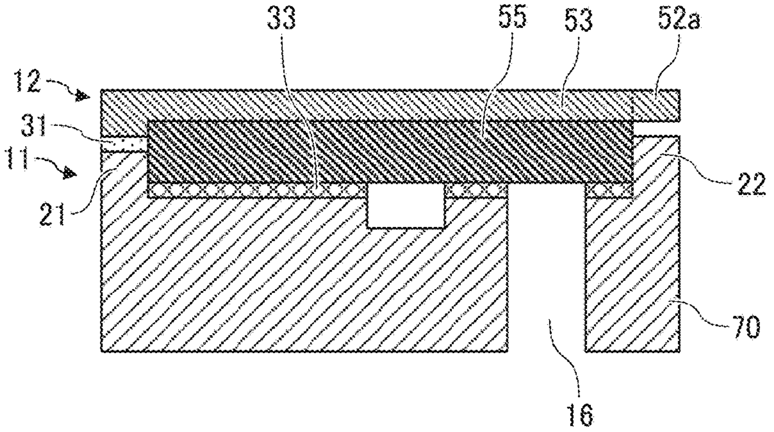
Figure 8C:
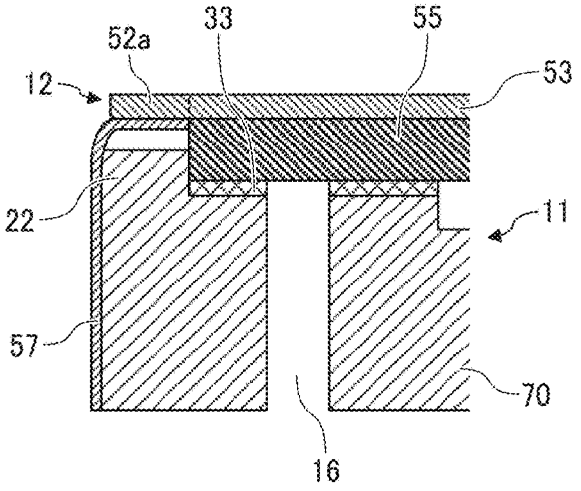

FIGS. 8A to 8C correspond, respectively, to FIGS. 5A to 5C. FIG. 8A is a schematic plan view of a first member 11 (frame 70) in Reference Example 1. The first member 11 in Reference Example 1 is identical to the first member 11 in FIG. 5A. FIGS. 8B and 8C are schematic cross-sectional views of a bonded member in Reference Example 1. FIG. 8B is a cross-sectional view taken along line D-D of FIG. 8A. FIG. 8C is a cross-sectional view taken along line E-E of FIG. 8A.

In Reference Example 1, no second adhesive 32 is used. As illustrated in FIG. 8B, no second adhesive 32 is used between an actuator substrate 53 and a second protrusion 22. As illustrated in FIG. 8C, no second adhesive 32 is used between a wiring 57 and a second protrusion 22.

In Reference Example 1, an electrode 52*a* thinnest (e.g., a thickness of 75 μm) in an actuator is out of protection, and a gap (space) of approximately 150 μm is present between the electrode 52*a* and the second protrusion 22. Thus, the electrode 52*a* was damaged during assembly. As a result, for reinforcement of the electrode 52*a*, preferably, the gap between the electrode 52*a* and the protrusion is filled with the second adhesive as a reinforcer.

Figure 9:
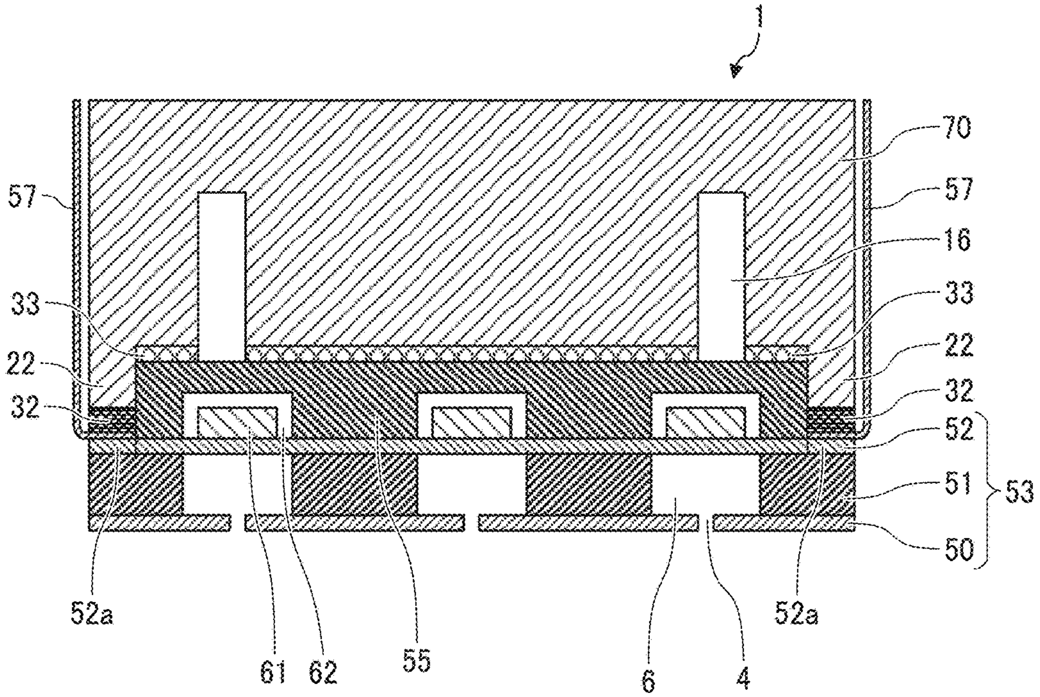
FIG. 9 is a schematic cross-sectional view of an example of a liquid discharge head according to the present embodiment.

Next, the liquid discharge head 1 according to the present embodiment will be further described with FIG. 9. FIG. 9 illustrates a liquid discharge head 1 according to the present example. FIG. 9 is a schematic cross-sectional view of a liquid discharge head 1 according to the present example, and corresponds to, for example, in a case where line B-B of FIG. 5A is further extended, a schematic cross-sectional view taken along the extended line B-B.

The schematic cross-sectional view in the present example illustrates no common chamber.

The liquid discharge head 1 according to the present example includes a frame 70, an actuator substrate 53, and a support substrate 55. The frame 70 has a common channel 16 through which liquid (e.g., ink) is supplied. The liquid supplied through the common channel 16 is supplied to an individual chamber 6 through a channel.

The actuator substrate 53 includes, for example, a nozzle plate 50, a chamber member 51, and an actuator 52. The nozzle plate 50 has multiple nozzles 4 through which liquid is discharged. The chamber member 51 has a liquid chamber (individual chamber 6) in communication with a nozzle. The actuator 52 includes a piezoelectric element 61 and an electrode 52*a*.

The support substrate 55 has a drive region 62 for the piezoelectric element 61. The support substrate 55 is bonded to the frame 70 and the actuator substrate 53.

In the liquid discharge head 1 according to the present example, the piezoelectric element 61 applies pressure to the liquid inside the individual chamber 6, so that the liquid is discharged through the nozzle 4.

In the present example, the frame 70 as a first member 11 has a second protrusion 22 bonded to the actuator substrate 53 with a second adhesive 32. The frame 70 is bonded to the support substrate 55 with a third adhesive 33.

The electrode 52*a* in the present example corresponds to a region that does not face the support substrate 55 but is in contact with a wiring 57. The electrode 52*a* is bonded to the second protrusion 22 through the wiring 57 and the second adhesive 32. The electrode 52*a* is thinnest in thickness in the actuator 52. The gap between the electrode 52*a* and the second protrusion 22 is filled with the second adhesive 32. That is, the liquid discharge head 1 according to the present example has a preferable configuration.

Liquid Discharge Apparatus and Liquid Discharge Device

Next, an inkjet recording apparatus 90 is described below as an example of the liquid discharge apparatus according to the present embodiment.

Figure 10:
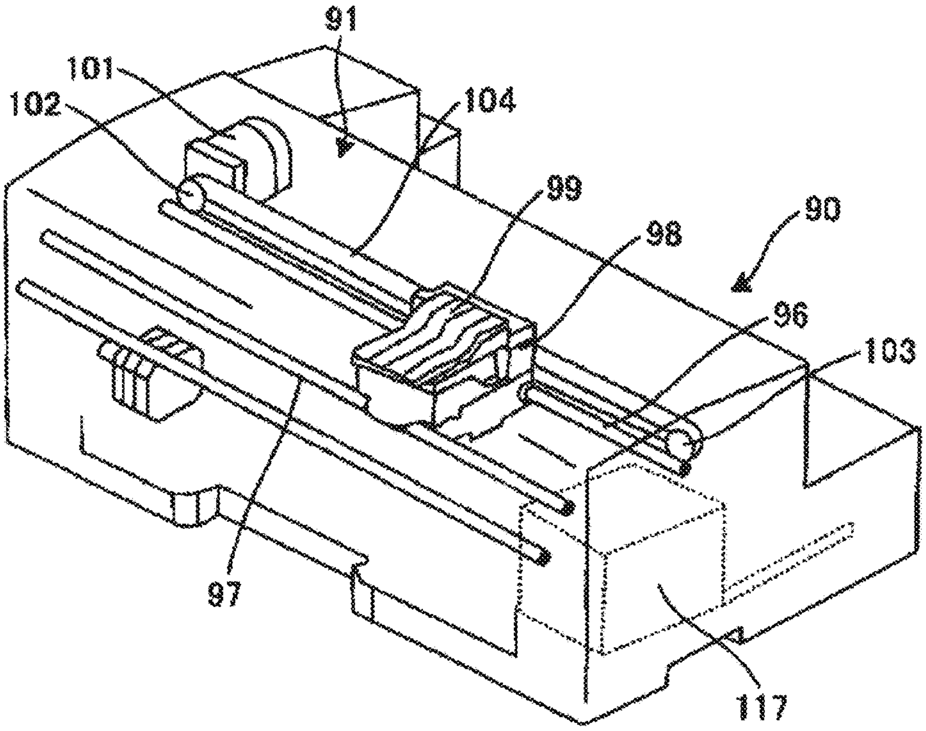
FIG. 10 is a schematic perspective view of an example of a liquid discharge apparatus according to the present embodiment.
Figure 11:
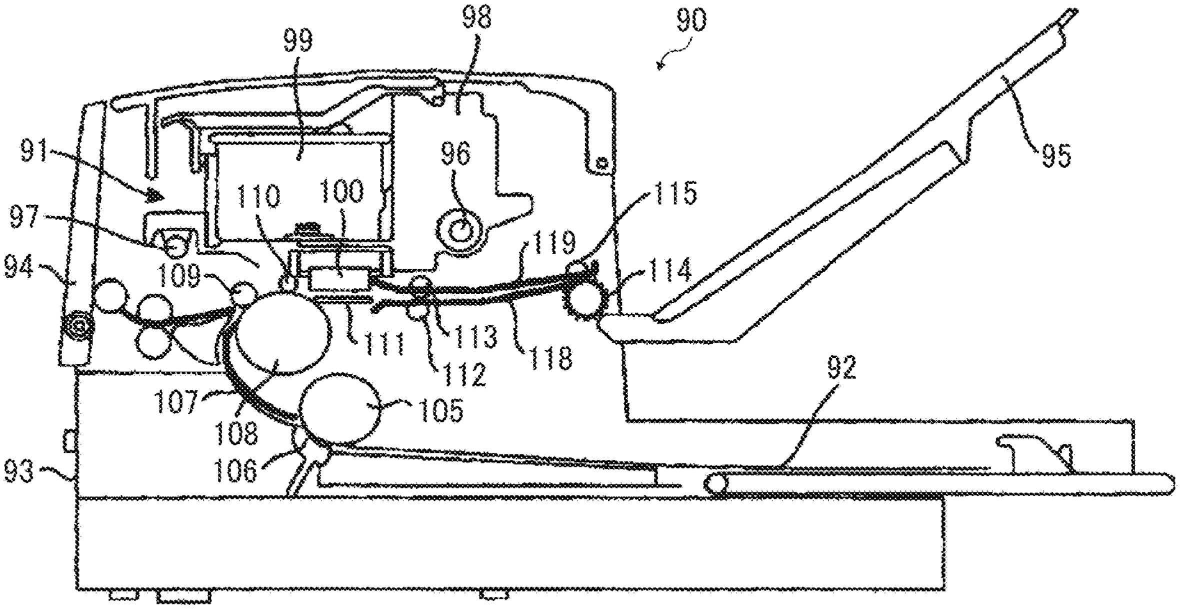
FIG. 11 is a schematic side view of the example of the liquid discharge apparatus according to the present embodiment.

FIGS. 10 and 11 illustrate an inkjet recording apparatus 90 according to the present example.

The inkjet recording apparatus 90 includes, for example, a carriage 98, a liquid discharge head 1, and a print mechanism 91. The carriage 98 is movable in the scanning direction inside an apparatus body. As the liquid discharge head 1, the liquid discharge head 1 according to the present embodiment can be used. For example, the liquid discharge head 1 is mounted on the carriage 98. The print mechanism 91 includes, for example, an ink cartridge 99 that supplies ink to the liquid discharge head 1.

The apparatus body has a lower portion to which a sheet feeding cassette 93 (or a sheet feeding tray), on which multiple sheets 92 can be loaded, is detachably attached from the front side. Provided may be a manual sheet feeding tray 94 openable for manual feeding of a sheet 92. After import of a sheet 92 fed from the sheet feeding cassette 93 or the manual sheet feeding tray 94, the print mechanism 91 records a required image on the sheet 92. After that, the sheet 92 is ejected to a sheet ejection tray 95 attached to the back face side.

The print mechanism 91 includes a primary guide rod 96 and a secondary guide rod 97 as guide members laterally bridged between a left side plate and a right side plate, and retains the carriage 98 slidably in the main scanning direction. The liquid discharge head 1 that discharges ink droplets of respective colors of yellow (Y), cyan (C), magenta (M), and black (Bk) is attached to the carriage 98 such that multiple ink discharge ports (nozzles) is arrayed in a direction intersecting the main scanning direction with a downward direction of discharging of ink droplets. Ink cartridges 99 each for supplying ink for the corresponding color to the liquid discharge head 1 are exchangeably attached to the carriage 98.

The ink cartridges 99 each have an upper portion provided with an air vent in communication with the air and a lower portion provided with a supply port for supplying ink to the liquid discharge head 1. The ink cartridges 99 each have a porous member filled with ink, inside. Due to the capillary force of the porous member, the ink to be supplied to the liquid discharge head 1 is kept at a slight negative pressure.

As the liquid discharge head 1, provided are liquid discharge heads 1 for the colors. However, provided may be a single liquid discharge head 1 having nozzles for discharging ink droplets of the colors.

The carriage 98 has a rear portion (on the downstream side of sheet conveyance) slidably fit to the primary guide rod 96 and a front portion (on the upstream side of sheet conveyance) slidably placed on the secondary guide rod 97. In order to move the carriage 98 for scanning in the main scanning direction, a timing belt 104 is stretched between a drive pulley 102 that a main scanning motor 101 drives to rotate and a driven pulley 103. The timing belt 104 is secured to the carriage 98. Thus, the carriage 98 reciprocates due to forward and reverse rotations of the main scanning motor 101.

For conveyance of a sheet 92 set in the sheet feeding cassette 93 to the lower side of the liquid discharge head 1, the apparatus according to the present example includes a sheet feeding roller 105, a friction pad 106, a guide member 107, a conveying roller 108, and a leading rolling member 110.

The sheet feeding roller 105 and the friction pad 106 separates and feeds a sheet 92 from the sheet feeding cassette 93. The guide member 107 guides the sheet 92. The conveying roller 108 inverts and conveys the fed sheet 92. The leading rolling member 110 regulates the angle of delivery of the sheet 92 from a conveying rolling member 109 thrust against the circumferential face of the conveying roller 108 and the conveying roller 108. The conveying roller 108 is driven to rotate by a sub-scanning motor through a gear train.

The apparatus according to the present example includes a sheet guide member 111. The sheet guide member 111 guides, on the lower side of the liquid discharge head 1, the sheet 92 delivered from the conveying roller 108 in accordance with the range of movement of the carriage 98 in the main scanning direction.

On the downstream side in the direction of sheet conveyance of the sheet guide member 111, provided are a conveying rolling member 112 and a spur gear 113 to be driven to rotate to deliver the sheet 92 in the direction of sheet ejection. Furthermore, disposed are a sheet ejection roller 114 and a spur gear 115 that deliver the sheet 92 to the sheet ejection tray 95, and guide members 118 and 119 forming a sheet ejection path.

For recording, while moving the carriage 98, the inkjet recording apparatus 90 drives the liquid discharge head 1 in accordance with an image signal. For example, ink is discharged to the sheet 92 remaining stopped to perform recording for one line. Then, after a predetermined amount of conveyance of the sheet 92, recording is performed for the next line. In response to reception of a recording termination signal or a signal indicating that the rear end of the sheet 92 has reached the recording region, the recording operation terminates, leading to ejection of the sheet 92.

A recovery device 117 that recovers the liquid discharge head 1 from discharge trouble is disposed out of the recording region on the right end side in the direction of movement of the carriage 98. The recovery device 117 includes a cap, a sucker, and a cleaner. The carriage 98 moves to the side of location of the recovery device 117 in order to stand for printing. Then, the liquid discharge head 1 is capped with the cap to keep a discharge port portion in a moist state, leading to prevention of discharge trouble due to ink drying.

For example, in the middle of recording, ink discharge not relating to the recording causes the viscosity of ink at all the discharge ports to be constant, leading to maintenance of a stable discharge state.

For example, in a case where discharge trouble occurs, the cap seals hermetically the discharge ports (nozzles) of the liquid discharge head 1. Then, the sucker sucks out, for example, air bubbles together with ink from the discharge ports through a tube. Thus, the cleaner removes, for example, ink or dust having adhered to a discharge port face, resulting in recovery from the discharge trouble. The sucked ink is discharged to a waste ink container provided at the lower portion of the body and then is absorbed and retained by an ink absorber inside the waste ink container.

The inkjet recording apparatus 90 including the liquid discharge head 1 according to the present embodiment enables a stable ink discharging characteristic, leading to an improvement in image quality. The inkjet recording apparatus 90 including the liquid discharge head 1 has been described above. However, the liquid discharge head 1 may be applied to an apparatus that discharges non-ink liquid droplets, such as liquid resist for patterning.

Next, another embodiment of the liquid discharge apparatus according to the present embodiment will be described. A recording apparatus will be described below as an example of the liquid discharge apparatus according to the present embodiment.

The liquid discharge head according to the present embodiment can be used in various types of recording apparatuses of an inkjet recording system, such as a printer, a facsimile apparatus, a copying machine, a printer/facsimile/multifunction peripheral, a solid shaping apparatus, and a bioprinter.

In the present embodiment, a recording apparatus corresponds to an apparatus capable of discharging ink or various types of treatment liquids to a recording medium, and a recording method corresponds to a method for recording with the apparatus. Such a recording medium denotes an object to which ink or various types of treatment liquids can adhere temporarily.

The recording apparatus can include not only a head that discharges ink but also a feeder, a conveyer, and an ejector for recording media, and devices, such as a preprocessing device and postprocessing device.

For the recording apparatus and the recording method, provided may be a heater for use in a heat process and a dryer for use in a dry process. For example, the heater heats the printed face or back face of a recording medium. The dryer dries the printed face or back face of a recording medium. Examples of the heater and the dryer that can be used include, but are not particularly limited to, a warm air heater and an infrared heater. Heating and drying can be performed, for example, before printing, during printing, or after printing.

The recording apparatus and the recording method are not limited to visualization of a significant image, such as a character or a figure, with ink. For example, the recording apparatus and the recording method may be intended for formation of a pattern, such as a geometric pattern, or shaping of a three-dimensional image. Examples of the recording apparatus include, but are not particularly limited to, a serial type apparatus that moves a liquid discharge head and a line type apparatus that does not move a liquid discharge head. Examples of the recording apparatus further include a desktop recording apparatus, a wide recording apparatus capable of printing to an AO-size recording medium, and a continuous stationery printer for rolled continuous paper as a recording medium.

Figure 12:
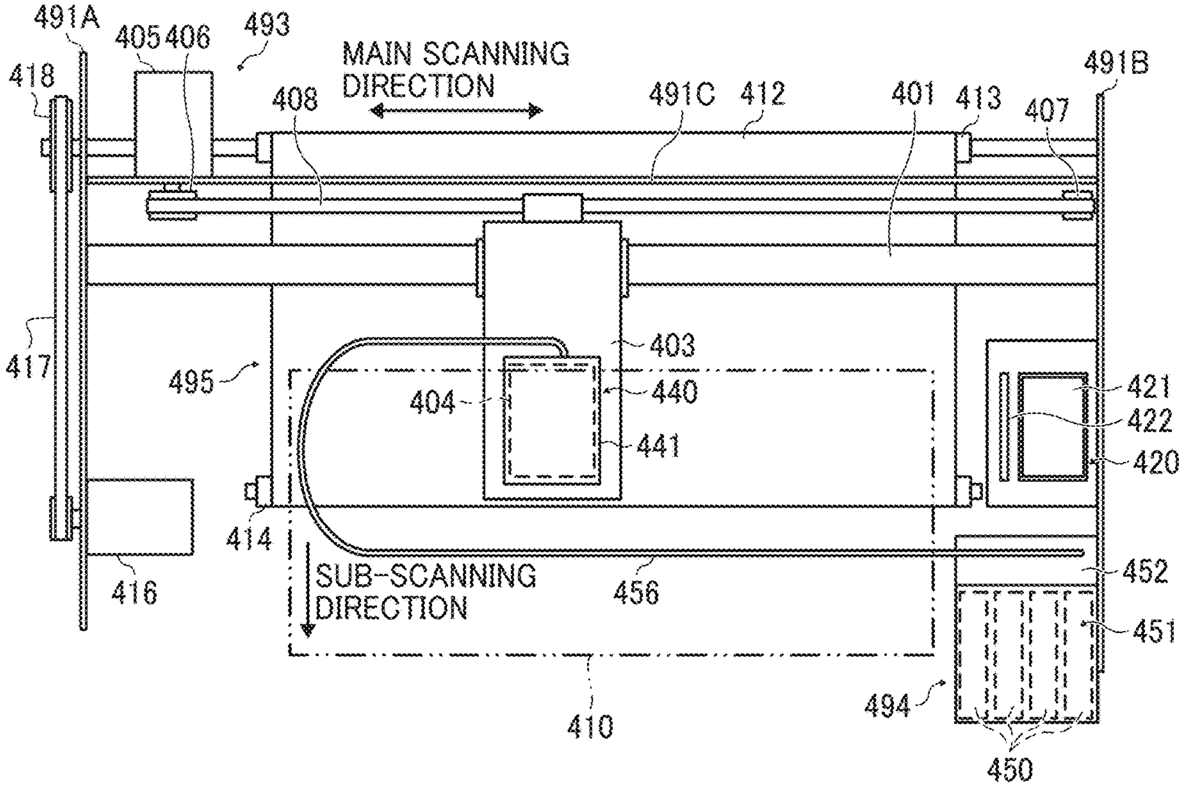
FIG. 12 is a schematic view of another example of the liquid discharge apparatus according to the present embodiment.
Figure 13:
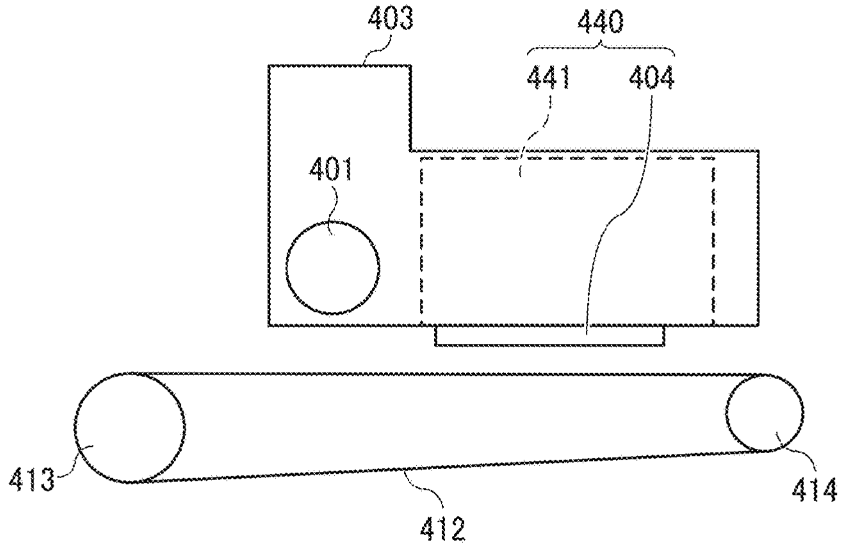
FIG. 13 is a schematic view of the another example of the liquid discharge apparatus according to the present embodiment.

Next, another example of the liquid discharge apparatus according to the present embodiment will be described with reference to FIGS. 12 and 13. FIG. 12 is an explanatory plan view of a main part of the apparatus. FIG. 13 is an explanatory side view of the main part of the apparatus.

The apparatus serves as a serial type apparatus. Due to a main scanning movement mechanism 493, a carriage 403 reciprocates in the main scanning direction. The main scanning movement mechanism 493 includes a guide member 401, a main scanning motor 405, and a timing belt 408. The guide member 401 is bridged between a left side plate 491A and a right side plate 491B and retains the carriage 403 movably. Then, due to the main scanning motor 405, the carriage 403 reciprocates in the main scanning direction through the timing belt 408 bridged between a drive pulley 406 and a driven pulley 407.

The carriage 403 is equipped with a liquid discharge device 440 including a liquid discharge head 404 according to the present embodiment and a head tank 441, integrally. The liquid discharge head 404 of the liquid discharge device 440 discharges liquids of colors, such as yellow (Y), cyan (C), magenta (M), and black (K). The liquid discharge head 404 is attached such that a nozzle array of multiple nozzles 4 is disposed in the sub-scanning direction orthogonal to the main scanning direction with a downward direction of discharging.

A supply mechanism 494 that supplies the liquid discharge head 404 with liquid stored outside the liquid discharge head 404 supplies the head tank 441 with liquid stored in a liquid cartridge 450.

The supply mechanism 494 includes a cartridge holder 451 as a holder to which the liquid cartridge 450 is attached, a tube 456, and a liquid feeding unit 452 including a liquid feeding pump. The liquid cartridge 450 is detachably attached to the cartridge holder 451. The liquid feeding unit 452 feeds the liquid from the liquid cartridge 450 to the head tank 441 through the tube 456.

The apparatus includes a conveyance mechanism 495 that conveys a sheet 410. The conveyance mechanism 495 includes a conveying belt 412 as a conveyor and a sub-scanning motor 416 that drives the conveying belt 412.

The conveying belt 412 attracts and conveys the sheet 410 such that the sheet 410 faces the liquid discharge head 404. The conveying belt 412 serves as an endless belt stretched between a conveying roller 413 and a tension roller 414. Such attraction as above can be achieved by electrostatic attraction or air suction.

Then, through a timing belt 417 and a timing pulley 418, the sub-scanning motor 416 drives the conveying roller 413 to rotate, so that the conveying belt 412 runs circumferentially in the sub-scanning direction.

Furthermore, on the lateral side of the conveying belt 412 on one side in the main scanning direction of the carriage 403, disposed is a maintenance mechanism 420 that maintains the liquid discharge head 404.

The maintenance mechanism 420 includes, for example, a cap member 421 that caps the nozzle face of the liquid discharge head 404 (face on which the nozzles 4 are formed) and a wiper member 422 that wipes the nozzle face.

The main scanning movement mechanism 493, the supply mechanism 494, the maintenance mechanism 420, and the conveyance mechanism 495 are attached to a housing including the left side plate 491A, the right side plate 491B, and a rear plate 491C.

In the apparatus having such a configuration as above, the sheet 410 is fed on and attracted to the conveying belt 412. Then, the sheet 410 is conveyed in the sub-scanning direction due to a circumferential run of the conveying belt 412.

Then, with the carriage 403 moving in the main scanning direction, the liquid discharge head 404 is driven, in accordance with an image signal, to discharge liquid to the sheet 410 remaining stopped, leading to formation of an image.

As above, the apparatus including the liquid discharge head according to the present embodiment enables stable formation of a high-quality image.

Next, another example of the liquid discharge device according to the present embodiment will be described with reference to FIG. 14.

Figure 14:
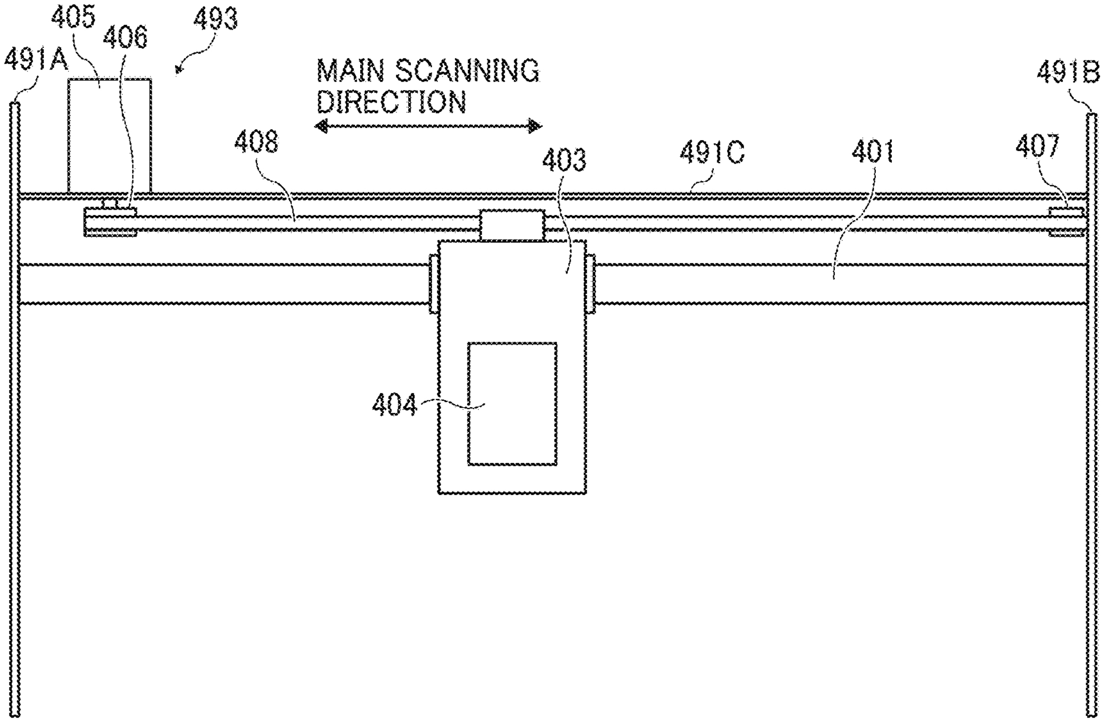
FIG. 14 is a schematic view of an example of a liquid discharge device.

FIG. 14 is an explanatory plan view of a main part of the liquid discharge device.

The liquid discharge device includes the housing including the left side plate 491A, the right side plate 491B, and the rear plate 491C, the main scanning movement mechanism 493, the carriage 403, and the liquid discharge head 404, from among the constituent members of the liquid discharge apparatus described above.

Note that, for example, the liquid discharge device may have the right side plate 491B to which at least either the maintenance mechanism 420 or supply mechanism 494 described above is attached.

Figure 15:
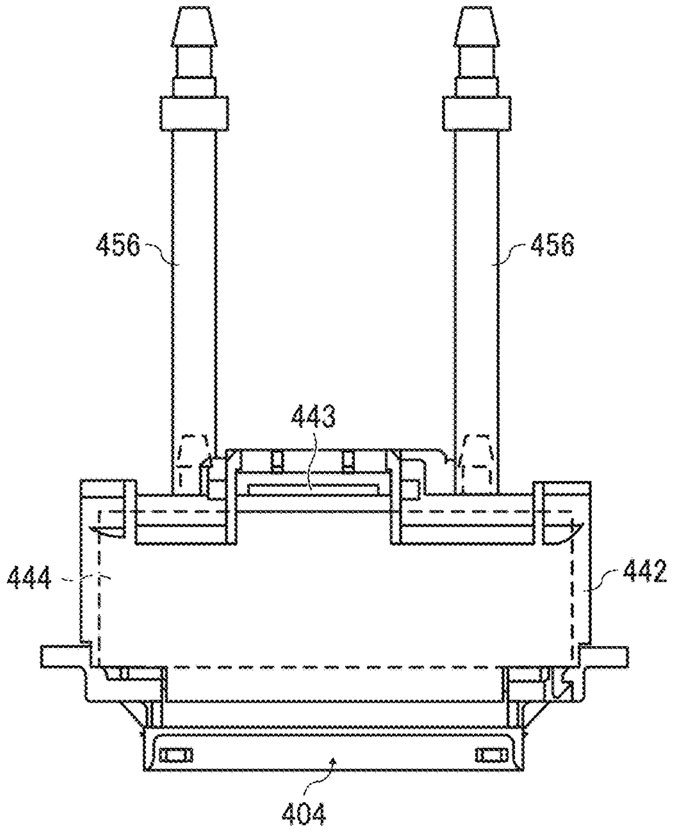
FIG. 15 is a schematic view of another example of the liquid discharge device.

Next, still another example of the liquid discharge device according to the present embodiment will be described with reference to FIG. 15. FIG. 15 is an explanatory front view of the liquid discharge device.

The liquid discharge device includes a liquid discharge head 404 to which a channel component 444 is attached, and a tube 456 connected to the channel component 444.

Note that the channel component 444 is disposed inside a cover 442. Instead of the channel component 444, a head tank 441 can be provided. The channel component 444 has an upper portion provided with a connector 443 for electrical connection with the liquid discharge head 404.

In the present specification, the "liquid discharge apparatus" includes a liquid discharge head or a liquid discharge device and drives the liquid discharge head to discharge liquid. Examples of the liquid discharge apparatus include an apparatus capable of discharging liquid to an object to which liquid can adhere and an apparatus that discharges liquid into gas or liquid.

The "liquid discharge apparatus" can include a feeder, a conveyer, and an ejector for an object to which liquid can adhere, a preprocessing device, and a postprocessing device.

Examples of the "liquid discharge apparatus" include an image forming apparatus that discharges ink to a sheet to form an image on the sheet, and a solid shaping apparatus (three-dimensionally shaping apparatus) that discharges shaping liquid to a powder-conglomeration layer as a layered conglomeration of powder in order to shape a solid shaped object (three-dimensionally shaped object).

The "liquid discharge apparatus" is not limited to visualization of a significant image, such as a character or a figure, with discharged liquid. For example, the liquid discharge apparatus may be intended for formation of a meaningless pattern or shaping of a three-dimensional image.

The "object to which liquid can adhere" denotes an object to which liquid can adhere at least temporarily, an object on which liquid fastens after adhering to, and an object into which liquid permeates after adhering to. Specific examples of the "object to which liquid can adhere" include a recording medium, such as a sheet, recording paper, a recording sheet, a film, or cloth, an electronic component, such as an electronic circuit board or a piezoelectric element, and a medium, such as a powder-conglomeration layer (powder layer), an organ model, or a testing cell. Unless otherwise particularly limited, the "object to which liquid can adhere" may be any object to which liquid adheres.

Examples of the material of the "object to which liquid can adhere" include paper, thread, fiber, fabric, leather, metal, plastic, glass, wood, ceramic, building materials, such as wallpaper and flooring, and a textile for clothing that enable temporary adhesion of liquid.

Examples of the "liquid" include ink, treatment liquid, a deoxyribonucleic acid (DNA) sample, resist, pattern material, a binder, shaping liquid, and a solution or dispersion liquid containing an amino acid, protein, or calcium.

The "liquid discharge apparatus" may be, but is not limited to, an apparatus that moves relatively a liquid discharge head and an object to which liquid can adhere. Specific examples of the "liquid discharge apparatus" include a serial type apparatus that moves a liquid discharge head and a line type apparatus that does not move a liquid discharge head.

Examples of the "liquid discharge apparatus" further include a treatment-liquid coating apparatus that discharges, for the purpose of reforming the surface of a sheet, treatment liquid to the sheet to coat the treatment liquid on the surface of the sheet, and a jet granulation apparatus that jets a composition liquid including row material dispersed in a solution, through a nozzle to granulate fine particles of the row material.

The "liquid discharge device" corresponds to an integration of a liquid discharge head and a functional component or mechanism, namely, an assembly of components relating to liquid discharge. Examples of the "liquid discharge device" include a combination of a liquid discharge head with at least one of a head tank, a carriage, a supply mechanism, a maintenance mechanism, or a main scanning movement mechanism.

Examples of such an integration as above include a combination of a liquid discharge head and a functional component or mechanism secured together, for example, by fastening, bonding, or engaging, and a combination of a liquid discharge head and a functional component or mechanism, in which one of the liquid discharge head and the functional component or mechanism is retained movably to the other. A liquid discharge head and a functional component or mechanism may be detachably attachable to each other.

Like the liquid discharge device 440 illustrated in FIG. 13, for example, a liquid discharge head and a head tank are integrated together as a liquid discharge device. For example, a liquid discharge head and a head tank mutually connected through a tube are integrated together as a liquid discharge device. Such a liquid discharge device can have a unit including a filter between the head tank and the liquid discharge head.

For example, a liquid discharge head and a carriage are integrated together as a liquid discharge device.

For example, a liquid discharge head and a main scanning movement mechanism are integrated together as a liquid discharge device, with the liquid discharge head retained movably by a guide member as part of the main scanning movement mechanism. For example, as such a liquid discharge device as illustrated in FIG. 14, a liquid discharge head, a carriage, and a main scanning movement mechanism are integrated together.

For example, a liquid discharge head, a carriage, and a maintenance mechanism are integrated together as a liquid discharge device, in which a cap member as part of the maintenance mechanism is secured to the carriage to which the liquid discharge head is attached.

For example, as such a liquid discharge device as illustrated in FIG. 15, a liquid discharge head and a supply mechanism are integrated together, with a tube connected to the liquid discharge head to which a head tank or a channel component is attached.

Such a main scanning movement mechanism as above includes a guide member as a single item. Such a supply mechanism as above includes a tube as a single item and a holder as a single item.

The "liquid discharge head" is not limited in terms of a pressure generator to be used. For example, instead of such a piezoelectric actuator as described in the above embodiment (or a multilayered piezoelectric element), used may be a thermal actuator employing a thermoelectric conversion element, such as a heat-generating resistor, or an electrostatic actuator including a vibration membrane and opposed electrodes.

According to the present embodiment, provided can be a liquid discharge head including a bonded member based on bonding with two or more types of adhesive, with inhibition of mixture of different types of adhesive in each bonding region.

In the present specification, the terms "image forming", "recording", "printing", "image printing". "print", and "shaping" are synonymous.

[Aspect 1]

A liquid discharge head (1) includes: a first member (11): and a second member (12) bonded to the first member (11). The first member (11) has: a first protrusion (21) protruding to the second member (12), a second protrusion (22) protruding to the second member (12), the second protrusion having a height different from the first protrusion, the second member (12) includes: a first portion (53) bonded to the first protrusion (21) with a first adhesive (31); and a second portion (52*a*) bonded to the second protrusion (22) with a second adhesive (32), the second portion (52*a*) having a height different from the first portion (53), and, a type of the second adhesive (32) is different from a type of the first adhesive (31).

[Aspect 2]

In the liquid discharge head (1) according to Aspect 1, the first protrusion (21) has multiple first protrusions (21) having the same height, the first adhesive (31) is applied to each of the multiple first protrusions (21), the second protrusion (22) has multiple second protrusions (22) having the same height, the second adhesive (32) is applied to each of the multiple second protrusions (22) having the same height.

[Aspect 3]

In the liquid discharge head (1) according to Aspect 2, the first member (11) has a rectangular shape elongated in a longitudinal direction, the first member (11) has the multiple first protrusions (21) disposed at four corners of the first member (11), and the first member (11) has the multiple second protrusion (22) on each end of the first member (11) in a transverse direction orthogonal to the longitudinal direction.

[Aspect 4]

In the liquid discharge head (1) according to Aspect 3, further includes a third adhesive (33), a type of which is different from the type of the first adhesive (31) and the type of the second adhesive (32), the first adhesive (31) is photo-curable, the second adhesive (32) is not photo-curable, the first member (11) further includes a third portion other than the first protrusion (21) and the second protrusion (22), and the third adhesive (33) is applied to the third portion.

[Aspect 5]

In the liquid discharge head (1) according to Aspect 2, wherein the first adhesive (31) applied to each of the multiple first protrusions (21) has the same thickness, the second adhesive (32) applied to each of the multiple second protrusions (22) has the same thickness, and a thickness of the first adhesive (31) and a thickness of the second adhesive (32) are different.

[Aspect 6]

In the liquid discharge head (1) according to Aspect 1, the first member (11) includes a common channel (16) having liquid; the second member (12) includes, an actuator substrate (53); and a support substrate (55) bonded to the actuator substrate (53), and the actuator substrate (53) includes: a nozzle plate (50) having multiple nozzles (4); a chamber member (51) including multiple individual chambers (6) respectively communicating with the multiple nozzles (4), and communicating with the common channel (16) of the first member; and an actuator (52) including a piezoelectric element (61) and an electrode (52*a*) connected to the piezoelectric element (61), the piezoelectric element (61) is configured to discharge the liquid in the multiple individual chambers (6) from the multiple nozzles (4).

[Aspect 7]

In the liquid discharge head (1) according to Aspect 6, further includes a wiring (57) contacting the electrode (52*a*), The electrode (52*a*) is bonded to the second protrusion (22) via the wiring (57) and the second adhesive (32), the electrode (52*a*) has a thickness thinnest in the actuator (52), and the second adhesive (32) fills a gap between the wiring (57) and the second protrusion (22).

[Aspect 8]

In the liquid discharge head (1) according to Aspect 1, the first member (11) has a recess (27) defined by two of the multiple second protrusions (22), and the second member (12) has a third protrusion (28) fitting into the recess (27).

[Aspect 9]

In the liquid discharge head (1) according to Aspect 1, the first member (11) has a groove (23) between the first protrusion (21) and the second protrusion (22).

[Aspect 10]

In a liquid discharge device (440) comprising the liquid discharge head (1) according to claim 1.

[Aspect 11]

In the liquid discharge device (440) according to Aspect 10, further comprising at least one of: a head tank (441) storing a liquid to be supplied to the liquid discharge head (1); a carriage (403) on which the liquid discharge head (1) is mounted; a supply mechanism (494) configured to supply the liquid to the liquid discharge head (1); a maintenance mechanism (420) configured to maintain the liquid discharge head (1); or a main scanning movement mechanism (493) configured to move the liquid discharge head (1) in a main scanning direction, combined together with the liquid discharge head (1) to form a single body.

[Aspect 12]

A liquid discharge apparatus (90) includes the liquid discharge device (440) according to claim 10.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
a first member; and
a second member bonded to the first member,
wherein the first member has:
a first protrusion protruding to the second member,
a second protrusion protruding to the second member, the second protrusion having a height different from the first protrusion,
the second member includes:
a first portion bonded to the first protrusion with a first adhesive; and
a second portion bonded to the second protrusion with a second adhesive, the second portion having a height different from the first portion, and
a type of the second adhesive is different from a type of the first adhesive.

2. The liquid discharge head according to claim 1,
wherein the first protrusion has multiple first protrusions having the same height,
the first adhesive is applied to each of the multiple first protrusions,
the second protrusion has multiple second protrusions having the same height,
the second adhesive is applied to each of the multiple second protrusions having the same height.

3. The liquid discharge head according to claim 2,
wherein the first member has a rectangular shape elongated in a longitudinal direction,
the first member has the multiple first protrusions disposed at four corners of the first member, and
the first member has the multiple second protrusion on each end of the first member in a transverse direction orthogonal to the longitudinal direction.

4. The liquid discharge head according to claim 3, further comprising a third adhesive, a type of which is different from the type of the first adhesive and the type of the second adhesive,
the first adhesive is photo-curable,
the second adhesive is not photo-curable,
the first member further includes a third portion other than the first protrusion and the second protrusion, and
the third adhesive is applied to the third portion.

5. The liquid discharge head according to claim 2,
wherein the first adhesive applied to each of the multiple first protrusions has the same thickness,
the second adhesive applied to each of the multiple second protrusions has the same thickness, and
a thickness of the first adhesive and a thickness of the second adhesive are different.

6. The liquid discharge head according to claim 1,
wherein the first member includes a common channel having liquid;
the second member includes:
an actuator substrate; and a support substrate bonded to the actuator substrate, and the actuator substrate includes:

a nozzle plate having multiple nozzles;

a chamber member including multiple individual chambers respectively communicating with the multiple nozzles, and communicating with the common channel of the first member; and an actuator including a piezoelectric element and an electrode connected to the piezoelectric element, the piezoelectric element is configured to discharge the liquid in the multiple individual chambers from the multiple nozzles.

7. The liquid discharge head according to claim 6, further comprising a wiring contacting the electrode, wherein the electrode is bonded to the second protrusion via the wiring and the second adhesive, the electrode has a thickness thinnest in the actuator, and the second adhesive fills a gap between the wiring and the second protrusion.

8. The liquid discharge head according to claim 2, wherein, the first member has a recess defined by two of the multiple second protrusions, and the second member has a third protrusion fitting into the recess.

9. The liquid discharge head according to claim 1, wherein, the first member has a groove between the first protrusion and the second protrusion.

10. A liquid discharge device comprising the liquid discharge head according to claim 1.

11. The liquid discharge device according to claim 10, further comprising at least one of:

a head tank storing a liquid to be supplied to the liquid discharge head;

a carriage on which the liquid discharge head is mounted;

a supply mechanism configured to supply the liquid to the liquid discharge head;

a maintenance mechanism configured to maintain the liquid discharge head; or a main scanning movement mechanism configured to move the liquid discharge head in a main scanning direction, combined together with the liquid discharge head to form a single body.

12. A liquid discharge apparatus comprising the liquid discharge device according to claim 10.

* * * * *